Figure 1:
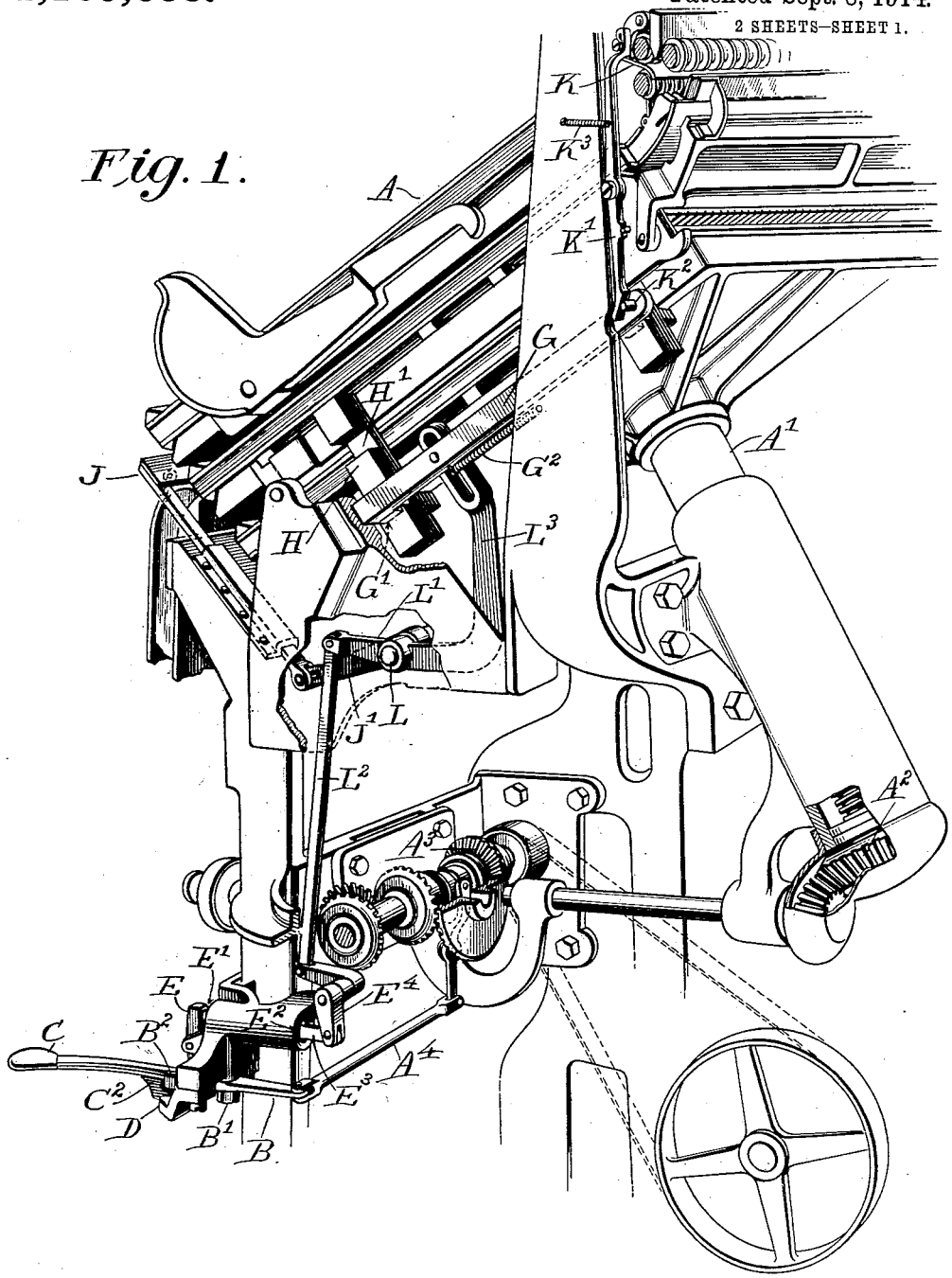

D. S. KENNEDY.
TYPOGRAPHICAL MACHINE.
APPLICATION FILED AUG. 6, 1912.

1,109,683.

Patented Sept. 8, 1914.

2 SHEETS—SHEET 2.

WITNESSES:

INVENTOR
David S. Kennedy
BY
P. T. Dodge
ATTORNEY

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL MACHINE.

1,109,683. Specification of Letters Patent. Patented Sept. 8, 1914.

Application filed August 6, 1912. Serial No. 713,595.

*To all whom it may concern:*

Be it known that I, DAVID S. KENNEDY, a citizen of the United States, and a resident of Brooklyn, county of Kings, and State of New York, have invented a new and useful Improvement in Typographical Machines, of which the following is a specification.

My invention relates to typographical machines, such as linotype machines of the character presented in the application for Letters Patent of John R. Rogers, Serial No. 624,426, filed May 1, 1911, wherein are disclosed a plurality of magazines, shifting means to bring a selected one into operative relation to the other parts, means for registering and locking it therein as well as means for determining whether or not the matrices are properly inclosed within the magazines. These latter means specifically comprise blades or feelers to contact with matrices protruding from the lower ends of the magazines, or matrices still remaining in the distributing mechanism, the blades or feelers being connected to the registering and locking means in such manner as to prevent the shifting of the magazines, unless the corresponding matrices are properly inclosed therein. The means for shifting the magazines are or may be of any suitable form, although I show my invention in connection with that type thereof illustrated in the application for Letters Patent of John R. Rogers, No. 659,284, filed November 9, 1911, wherein reversible power driven mechanism is presented, the said mechanism being under the control of an arm or handle.

The previously described blades or feelers, which detect the presence of matrices in the distributing mechanism, or the protrusion of matrices from the magazines, have been manually operated in connection with the registering and locking means, and it has sometimes happened that their too forcible actuation results in the bending or breakage of the matrices or other parts. To obviate this difficulty is one of the purposes of my invention, and to this end I preferably employ spring or other equivalent means to move the feelers to operative position, the said means being thus adapted to yield if the feelers contact with matrices. More specifically, I employ a spring which is placed under tension by the manual operation of the controlling means, and the force of which is allowed to exert itself when the unlocking occurs.

The power driven shifting means of the Rogers application, No. 659,284, are controlled by a lever, but my invention comprises an arrangement which permits the control of the shifting means, the locking means, and the blades or feelers, by a single handle, and which, moreover, prevents the accidental displacement of this handle, and in addition necessitates the tensioning of the spring to operate the locking devices and the feelers before the shifting means can be thrown into operation. Heretofore it has sometimes occurred that the locking device is only partly withdrawn when the shifting mechanism is thrown into action, but this contingency is obviated by my improved arrangement, and as a result thereof all of the connected parts are caused to operate in regular sequence and at the proper times. These and other advantages will appear from the detailed description which follows.

In the accompanying drawings, I have shown my invention as applied to the kind of machine previously referred to, but obviously many changes and variations may be made therein, and in its mode of application, without departing from its spirit. Generally speaking, I desire it to be distinctly understood that I do not limit myself to any specific form or embodiment, except in so far as such limitations are specified in the claims.

Figure 2:
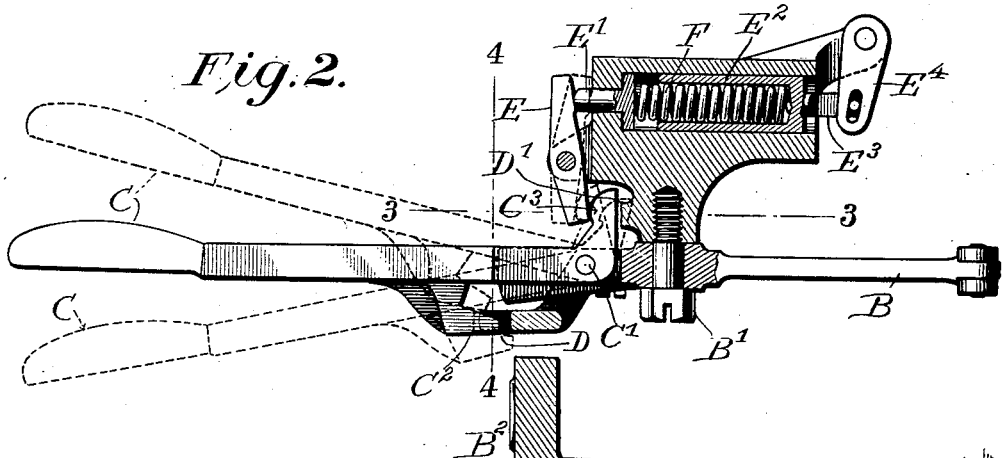
Figure 3:
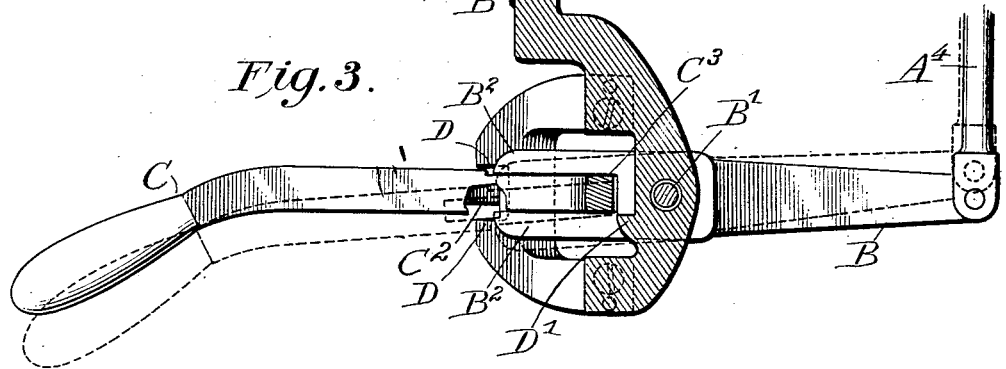
Figure 4:
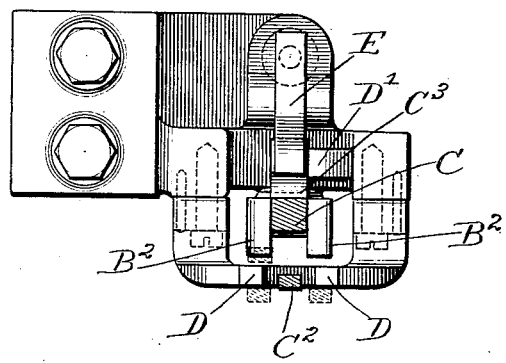

Referring to the drawings: Figure 1 is a side perspective view of a portion of a linotype machine, having my invention applied thereto; Fig. 2 is a vertical section through the controlling devices, on an enlarged scale; Fig. 3 is a horizontal sectional view, taken substantially on the line 3—3 in Fig. 2; and Fig. 4 is a vertical sectional view, taken substantially on the line 4—4 in Fig. 2.

The magazines A are mounted upon the post $A^1$, and connected gearing $A^2$ is employed to shift the selected one into operative relation to the other parts. The actuation of the gearing $A^2$ and its reversal are effected through adjustable gearing $A^3$ under the control of the link $A^4$ and the horizontally movable arm B, in substantially the same manner as in the Rogers application No. 659,284, to which reference may be had for further details. In connection therewith and in order to secure the advantages previously adverted to, I have devised the form of controlling means now to be described. The arm B is mounted so as to be capable of horizontal pivotal movement about the point $B^1$, and at its outer end is bifurcated and formed with two projections $B^2$, $B^2$, between which is disposed the operating handle proper C, pivotally connected to the arm B by the pintle $C^1$ which bridges the space between the projections $B^2$, $B^2$. Due to the pivotal mounting of the arm B and the pivotal connection thereto of the handle C, the latter is capable of vertical movement in both directions with reference to the arm B, and the arm B may be moved horizontally in both directions thereby. The vertical movements of the handle C control the locking and unlocking of the magazines, the actuation of the matrix blades or feelers, and also the locking and unlocking of the power driven shifting mechanism. When the handle C is in its normal position, as shown by full lines in Fig. 2, it is locked against horizontal movement by the engagement of its depending nose $C^2$ between the two locking cheeks D, D, projecting from the frame, the handle being yieldingly held in this position by the contact of its upwardly projecting arm $C^3$ with one arm of the pivoted lever E, the other arm of which is pressed outward by the plunger $E^1$ and spring F engaging therewith. The spring F has also other functions to be described hereafter. In order to effect the operative connection of the power driven shifting mechanism, it is necessary to disengage the nose $C^2$ from the locking cheeks D, D, and this is preferably done by moving the handle C downwardly to an abnormal neutral position, when the handle C and arm B may be moved laterally to throw the gearing $A^3$ into action as in the Rogers application No. 659,284. As occurring in actual practice, the movement of the arm B to the right causes the elevation of the magazines, and its movement to the left their depression. It should also be noted that the handle C may be raised to another abnormal neutral position, when it may be shifted to the left to effect the depression of the magazines, although in this upper position it may not be moved to the right, due to the proximity at this time of the arm $C^3$ to the projection $D^1$ on the framework. It will be noted that after the handle C has been raised or lowered and then shifted to the right or left, and due to the location of its nose $C^2$ above or below one of the locking cheeks D, it cannot be returned to its normal central position without first being shifted laterally to its abnormal neutral position.

As in the Rogers application No. 624,426, the magazines A are provided with a block H, formed with a series of locking notches $H^1$, which notches are brought into registration with the locking block $G^1$ on the locking bar G, at which time the spring $G^2$ acts to insert the block therein. The unlocking movement of the bar G in the opposite direction is effected by the arm $L^3$ connected thereto and mounted upon the rock shaft L. Also as in said application, I employ the blade or feeler J to pass across the mouth of the magazine in operative position and thus to detect a protruding matrix or matrices, the blade J being connected to and operated by the arms $J^1$ upon the rock shaft L. Also as presented in said application, I employ the blade or feeler K, which is moved into the distributing mechanism to determine the presence or absence of matrices therein, and is actuated by the pivoted lever $K^1$. The feeler K is held in its outward or inoperative position by the spring $K^3$ connected to the lever $K^1$, and is projected into the distributing mechanism by the contact with the lever of the pin $K^2$ on the locking bar G, when the latter is moved to its unlocking position.

As in the Rogers application, No. 659,284, the rock shaft L carries an arm $L^1$ connected by link $L^2$ to a bell crank lever $E^4$. However, in the present instance I have provided different means for actuating the lever $E^4$, it being connected to a piece $E^3$ projecting from the cylinder $E^2$, which surrounds and contacts with the previously mentioned spring F.

When the handle C is depressed in the manner previously described, its arm $C^3$ acting through the lever E and plunger $E^1$ compresses the spring F thereby storing up power which is subsequently utilized to operate the magazine locking device and the connected matrix feelers. The necessary resistance to permit this compression is afforded by the firm engagement of the locking piece $G^1$ of the bar G in the notch $H^1$, it being noted that when the magazines are at rest, they bear downward with sufficient force to hold the piece $G^1$ firmly therein. The depressed handle C is now moved to the right to elevate the magazines, and the first effect of this elevation is to relieve the pressure on the locking piece $G^1$. The compressed spring F is now free to act, and through the connections described, it rocks shaft L, and thus moves the locking piece $G^1$ out of the notch $H^1$, causes the feeler J to pass across the mouth of the magazine, and simultaneously the feeler K to be projected into the distributing mechanism. Due to the fact that the feelers J and K are thus actuated by a spring instead of manually, it follows that if either of them encounters a matrix or matrices, it will be arrested thereby without injury either to the matrices or the other parts. It will, of course, be understood that the spring F when tensioned has sufficient power to overcome that of the spring $G^2$, which acts to return the feelers to their inoperative positions, and to effect the locking operation of the bar G.

It has been pointed out that the depression of the handle C compresses the spring F, and it is compressed to a certain extent even when the handle is in its normal or midway position, due to the weight thereof acting on the lever E, and particularly if the operator's hand be resting on the handle. This partial compression of the spring F in such circumstances tends to resist the locking action of the spring G², and thus prevents the insertion of the locking block G¹ in the notch H¹. Consequently the handle C is also capable of being elevated to an upper position at suitable times, whereby the tension of the spring F is entirely relieved, thus permitting the free and unimpeded action of the spring G². It will also be noted that in this uppermost position of the handle, its nose C³ is again freed from engagement with the locking cheeks D, D, but, as at this time the arm C² is in proximity to the fixed stop D¹, the handle is thereby prevented from being turned toward the right, and may be moved only toward the left to cause the lowering of the magazines.

As above indicated, when the handle C is lowered and the spring F compressed thereby, the latter is not allowed to act until the magazines are raised enough to relieve the pressure on the locking piece G¹. It therefore follows that even when it is desired to lower the magazines, it is first necessary to raise them slightly, and consequently the handle C and arm D are always moved first to the right. The preferable mode of operating my improved devices is therefore as follows: If it be desired to raise the magazines, the handle C is first depressed, as shown by dotted lines in Fig. 2, thus freeing it and compressing the spring F. It is then moved to the right, as shown by dotted lines in Fig. 3, thereby starting the power driven mechanism to elevate the magazines. As soon as the frictional engagement between the locking piece G¹ and notch H¹ is relieved, the spring F acts to throw the piece out of the notch and to actuate the feelers J and K. When the magazines have been elevated to the necessary extent, the handle C is returned to its lower central position and then raised to its uppermost central position, as shown by dotted lines in Fig. 2, thereby entirely relieving the tension of the spring F and permitting the spring G² at the proper time to insert the locking piece G¹ in another notch H¹. The handle C is then moved to the left to depress the magazines slightly, that is to say, to an extent sufficient to restore the engagement between the locking piece G¹ and notch H¹. When it is desired to depress the magazines, the handle C is moved from its normal position to the lower one shown by dotted lines in Fig. 2, thus compressing the spring F, and then to the right to elevate the magazines sufficiently to free the engagement between the locking piece G¹ and notch H¹, when the spring F acts to unlock the magazines, etc., as before. The handle C is then immediately shifted to the left, reversing the power driven mechanism and effecting the lowering of the magazines to the desired extent, at which time the handle is returned to its central lowermost position and then raised to its uppermost position, when it is again moved to the left to lower the magazines slightly and restore the engagement of the locking piece G¹ and notch H¹. It will now be seen why the stop D¹ is employed to prevent the shifting of the handle C to the right, when it is in its uppermost position, as at this time the only movement necessary and desirable is toward the left, and for the purpose of slightly depressing the magazines.

As previously stated, I have shown my invention as applied in preferred form and by way of example, but obviously many changes and variations therein will suggest themselves to those skilled in the art and still be comprised within its scope.

Having thus described my invention, its construction and mode of operation, what I claim and desire to secure by Letters Patent of the United States, is as follows:

1. In a typographical machine, the combination of a plurality of magazines, reversible power driven mechanism to raise and lower said magazines, and controlling means for said mechanism, the said controlling means comprising a handle movable in different directions to control the operation of the power driven mechanism and mounted to be moved in another direction before it can be given the aforesaid movements.

2. In a typographical machine, the combination of a plurality of magazines, reversible power driven mechanism to raise and lower said magazines, and controlling means for said mechanism, the said controlling means comprising a handle movable in different directions from an abnormal neutral position to control the operation of the power driven mechanism, and means for preventing the return of the handle to normal position prior to its restoration to its abnormal neutral position.

3. In a typographical machine, the combination of a plurality of magazines, reversible power driven mechanism to raise and lower said magazines, and controlling means for said mechanism, the said controlling means comprising a handle capable of occupying several abnormal neutral positions, and movable in different directions from one of them, and movable in but one direction from another of them.

4. In a typographical machine, the combination of a plurality of magazines, reversible power driven mechanism to raise and lower said magazines, and controlling means for said mechanism, the said controlling means comprising a laterally movable handle and relatively stationary projections to prevent such lateral movement when the handle occupies its normal position.

5. In a typographical machine, the combination of a plurality of magazines, reversible power driven mechanism to raise and lower said magazines, and controlling means for said mechanism which occupy the same position after each operation, the said controlling means comprising the relatively movable arms B and C and devices for locking said means in their normal position, the said means adapted to be released therefrom by the relative movement of said arms.

6. In a typographical machine, the combination of a plurality of magazines, reversible power driven mechanism to raise and lower said magazines, and controlling means for said mechanism which occupy the same position after each operation, the said controlling means comprising the relatively movable arms B and C, and means for maintaining said arms in their normal relative position.

7. In a typographical machine, the combination of a plurality of magazines, reversible power driven mechanism to raise and lower said magazines, and controlling means for said mechanism which occupy the same position after each operation, the said means comprising the handle C movable from its normal position and the spring F to return it thereto.

8. In a typographical machine, the combination of a plurality of movable magazines, a locking device therefor, means for moving said magazines, and means for automatically releasing said locking device after the magazines have begun their movement.

9. In a typographical machine, the combination of a plurality of movable magazines, a locking device therefor, and spring-actuated means for releasing said locking device.

10. In a typographical machine, the combination of a plurality of movable magazines, a locking device therefor, power-actuated means for releasing said locking device, and mechanism for controlling the operation of said power-actuated means at will.

11. In a typographical machine, the combination of a plurality of magazines, a locking device therefor, power-actuated means for releasing said device, and independent means for moving the magazines, the said power-actuated means being rendered active by the operation of the magazine-moving means.

12. In a typographical machine, the combination of a plurality of magazines, a locking device therefor, power driven means for moving said magazines, mechanism for controlling the operation of said power driven means, and power means rendered active by the actuation of said controlling mechanism to release the locking device.

13. In a typographical machine, the combination of a plurality of magazines, a locking device therefor, power driven means for moving said magazines, an operating handle movable to control the action of said power driven means, and means rendered active by said movement of the operating handle for releasing the locking device.

14. In a typographical machine, the combination of a plurality of movable magazines, a locking device therefor, a spring, normally inactive, for releasing said locking device, and means for tensioning said spring to render it active.

15. In a typographical machine, the combination of a plurality of movable magazines, a locking device therefor, a spring, normally inactive, for releasing said locking device, and means for controlling the movement of said magazines, the operation of said means tensioning the spring to render it active.

16. In a typographical machine, the combination of a plurality of magazines, a locking device therefor, a spring, normally inactive, for releasing said locking device, power driven means for moving said magazines, and mechanism for controlling the action of said power driven means, the operation of said controlling mechanism tensioning the spring to render it active.

17. In a typographical machine, the combination of a plurality of movable magazines, a locking device therefor, power-actuated means for releasing said device, and means to control the movement of said magazines and simultaneously the action of said releasing means.

18. In a typographical machine, the combination of a plurality of magazines, a locking device therefor, power actuated means for releasing said device, power-actuated means for moving said magazines, and a device to control the action of both power-actuated means.

19. In a typographical machine, the combination of a plurality of movable magazines, a movable locking device therefor, springs for moving said locking device to locking and unlocking position, and means for controlling the action of said springs.

20. In a typographical machine, the combination of a magazine movable at will from its operative position, a feeler mounted independently of the magazine and movable transversely across its mouth to detect the presence of protruding matrices, and power-actuated means for operating the feeler.

21. In a typographical machine comprising distributing mechanism, power-actuated means under the control of the operator to determine at will the presence or absence of matrices in course of normal distribution therein.

22. In a typographical machine, the combination of a movable magazine, means for moving it, power-actuated means for determining whether or not matrices are protruding from the magazine, and a common device to control the action of both said means.

23. In a typographical machine, the combination of a movable magazine, distributing mechanism, means for moving the magazine, power-actuated means for determining the presence or absence of matrices in the distributing mechanism, and a common device to control the action of both said means.

24. In a typographical machine, the combination of distributing mechanism, a matrix feeler or detector to coöperate with the matrices therein, and means operable at will for moving the same, the said means being arranged to yield when the feeler engages the matrices.

25. In a typographical machine, the combination of distributing mechanism, a movable matrix feeler or detector to coöperate with the matrices therein, spring-actuated means for moving the same, and manually operable devices for controlling the action of said means.

26. In a typographical machine, the combination of a movable matrix feeler or detector, a spring, normally inactive, for actuating the same, and devices operable at will for tensioning the spring to render it active.

27. In a typographical machine, the combination of a movable magazine, means for controlling the movement thereof, a movable matrix feeler or detector, and spring-actuated means rendered active by the operation of the said controlling means for operating the matrix feeler or detector.

28. In a typographical machine, the combination of a magazine, power-driven means for moving it, devices for controlling the operation of said power-driven means, a movable matrix feeler or detector, and spring-actuated means rendered active by the operation of said controlling mechanism for moving the matrix feeler or detector to operative position.

29. In a typographical machine, the combination with a magazine and a coöperating part of the machine, one adapted to receive the matrices from the other, of a matrix feeler movable between said parts to detect the presence of matrices therebetween, and means operable at will for moving the feeler, the said means being arranged to yield when the feeler engages the matrices.

30. In a typographical machine, the combination with a magazine and a coöperating part of the machine, one adapted to receive matrices from the other, of a matrix feeler movable between said parts to detect the presence of matrices therebetween, spring-actuated means for moving the feeler, and manually operable devices for controlling the action of said means.

31. In a typographical machine, the combination of a movable magazine, power-actuated means to determine whether or not matrices are protruding therefrom, and devices controlled thereby to prevent the movement of the magazine.

32. In a typographical machine, the combination of a movable magazine, distributing mechanism, power-actuated means to determine whether or not matrices are present in the distributing mechanism, and devices controlled thereby to prevent the movement of the magazine.

33. In a typographical machine, the combination of a movable magazine, mechanism for moving it, and power-actuated means rendered active by the operation of said mechanism for determining whether or not matrices are protruding from the magazine.

34. In a typographical machine, the combination of a movable magazine, distributing mechanism, mechanism for moving the magazine, and power-actuated means rendered active by the operation of said moving-mechanism for determining whether or not matrices are pressed in the distributing mechanism.

35. In a typographical machine, the combination of a plurality of movable magazines, a locking device therefor, mechanism for moving said magazines, means for automatically releasing said locking device after the magazines have begun their movement, and means to prevent the release of said locking device when matrices are protruding from the magazines.

36. In a typographical machine, the combination of distributing mechanism, a plurality of magazines movably arranged so as to bring one or another into operative relation to the distributing mechanism, a locking device therefor, mechanism for moving the magazines, means for automatically releasing said locking device after the magazines have begun their movement, and means to prevent the release of said locking device when matrices are present in the distributing mechanism.

In testimony whereof I hereunto set my hand this fifth day of August, 1912, in the presence of two attesting witnesses.

DAVID S. KENNEDY.

Witnesses:
ALFRED W. F. GUEST,
HAROLD A. BURT.